(12) United States Patent
Buchanan

(10) Patent No.: US 7,024,640 B2
(45) Date of Patent: Apr. 4, 2006

(54) INTEGRATED CIRCUIT CELL IDENTIFICATION

(75) Inventor: Brent Buchanan, Emerson, GA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/897,817

(22) Filed: Jun. 29, 2001

(65) Prior Publication Data
US 2003/0005394 A1 Jan. 2, 2003

(51) Int. Cl.
*G06F 17/50* (2006.01)

(52) U.S. Cl. .............. 716/4; 716/2; 716/5; 716/11

(58) Field of Classification Search .......... 716/4, 716/5, 2, 11; 726/11
See application file for complete search history.

(56) References Cited

U.S. PATENT DOCUMENTS

| | | | | |
|---|---|---|---|---|
| 5,050,091 A | * | 9/1991 | Rubin | 716/10 |
| 5,197,016 A | * | 3/1993 | Sugimoto et al. | 716/8 |
| 5,487,018 A | * | 1/1996 | Loos et al. | 716/11 |
| 5,689,432 A | * | 11/1997 | Blaauw et al. | 716/18 |
| 6,115,546 A | * | 9/2000 | Chevallier et al. | 716/7 |
| 6,260,177 B1 | * | 7/2001 | Lee et al. | 716/2 |
| 6,442,565 B1 | * | 8/2002 | Tyra et al. | 707/103 |
| 6,446,239 B1 | * | 9/2002 | Markosian et al. | 716/2 |
| 6,529,913 B1 | * | 3/2003 | Doig et al. | 707/101 |
| 6,557,153 B1 | * | 4/2003 | Dahl et al. | 716/11 |
| 6,564,364 B1 | * | 5/2003 | Dahl et al. | 716/11 |
| 2002/0138813 A1 | * | 9/2002 | Teh et al. | 716/5 |
| 2002/0157068 A1 | * | 10/2002 | LaCour et al. | 716/3 |

OTHER PUBLICATIONS

P. McLellan, Effective Data Management for VLSI Design, Proceedings of the 22nd ACM/IEEE Design Automation Conference, pp. 652-657, Jun. 1985.*

T. Toyoda et al., A Fully Integrated Characterization and Management System for ASIC Libraries, Proceedings of 5th IEEE International ASIC Conference and Exhibit, pp. 245-248, Sep. 1992.*

R. Chiang et al., From CIF to Chips, Eighth University/ Government/ Industry Microelectronics Symposium, pp. 156-159, Jun. 1989.*

* cited by examiner

*Primary Examiner*—A. M. Thompson
(74) *Attorney, Agent, or Firm*—Peter Zawilski

(57) ABSTRACT

Apparatus, method and program product for evaluating design code of an integrated circuit. A program assigns an identifier to a cell based upon a cell characteristic. The program catalogs the identifier in a database configured to store and recall the identifier and characteristic along with additional properties that pertain to the cell. The program may associate the identifier or characteristic with a cell embedded in the design code.

5 Claims, 2 Drawing Sheets

INTEGRATED CIRCUIT CELL IDENTIFICATION

FIELD OF THE INVENTION

The present invention relates to semiconductors, and more particularly to design and evaluation processes associated with the production of integrated circuits.

BACKGROUND OF THE INVENTION

Manufacturers of semiconductors regard testing and evaluation processes as ubiquitous and indispensable to design and production operations. Semiconductors, also known as integrated circuits (I.C.) and computer chips, are tiny electronic circuits etched on silicon that electronically process, store and move information. As broadly discussed below, processes associated with semiconductor production involve substantial investment of economic and manpower resources. Consequently, it is advantageous to verify I.C. layout integrity prior to committing a design to silicon.

Manufacturers create an integrated circuit on the surface of a doped, polished silicon wafer. Production processes may employ diffusion, thin films, oxidation, photolithography, deposition and/or etching techniques to apply a first microscopic layer to the wafer. Designers configure multiple layers of polysilicon, silicon oxide, silicon nitride and metal to form a unique structure responsive to intended application and desired electrical characteristics.

During a masking phase, a chip manufacturer delineates microscopic paths operable to carry electronic impulses throughout the semiconductor. More particularly, masking processes apply a light sensitive resist substance to the wafer. Manufacturers position a detailed mask of thousands of individual semiconductor circuits over the surface, and project lights onto the wafer. Surfaces left exposed by the mask are altered by the light, and a chemical wash reveals a new mask layer on the wafer. The process repeats for each desired layer, resulting in elaborate, miniaturized circuitry.

An I.C. design file drives the masking processes. Program code within the file describes and defines mask parameters and specifications as read by the production equipment. Conventional formats for such files include Graphic Design System (GDS) and Caltech Intermediate Format (CIF). Design files comprise, in part, sequences of cell descriptions. Cells may be viewed as preprogrammed logical units that perform a distinct function. For instance, individual cells may comprise investors, capacitors, gates, oscillators and/or multiplexors. As such, the standard cells may be incorporated into multiple semiconductor designs. When incorporated into a file layout, design engineers integrate these individual cells with others to form a chip layer.

Parent libraries store individual cells along with others grouped by version or designer preference. In this manner, the libraries may act as a template or pallette from which designers may retrieve and apply component cells. As such, libraries make cells available for automatic placement and routing within a custom semiconductor layout. In practice, designers may use default cells from a most recent library version to populate I.C. design files. Other applications may require proprietary cells from more dated, particular libraries.

Once the masked layers are in place, manufacturers use diamond saws to section hundreds of chips from the wafer. The chip may then be encased in a plastic or ceramic shell with exposed connectors. The completed product may be tested once more and put through a "burn-in" or trial use process. Packaged chips that pass this final rigorous test are then installed into circuit boards and consumer products. Defective chips are discarded at a loss to the manufacturer.

Due to the complexities and costs inherent to the above manufacturing processes, it is extremely advantageous to detect errors prior to mask creation and application. However, typical I.C. design files may be marred with multiple instances of corruption. For example, faulty or otherwise obsolete cells may be erroneously incorporated or retained within a file. Left undiscovered, the inappropriate and broken processes borne of theses cells can propagate to production, ultimately translating into wasted resources. Additionally, other processes require identification of specific cells of interest, including those associated with license fees, unauthorized modifications and resource development.

Yet, in contrast to the highly automated environment responsible for chip layering, layout designers often must resort to manual evaluation of files prior to production. This labor and time intensive process tolerates error and inefficiency. Consequently, what is needed is an automated, efficient manner of identifying potentially, problematic cell structures within an I.C. design file.

SUMMARY OF THE INVENTION

The invention successfully incorporates computer-based technology to provide a systematic method, apparatus and program product for evaluating I.C. design code. One embodiment determines a cell characteristic for an unknown cell embedded within the design code by accessing a database of cell records. Each such cell record may be associated with a known cell having at least one cell characteristic. Exemplary cell characteristics may include a checksum value, a geometric property, a name, a time stamp, or some combination thereof. As such, the cell record may identify the cell characteristic of its associated, known cell. One embodiment may further compare the cell characteristic of the unknown cell with the cell characteristics stored in at least a subset of the cell records of the database. The embodiment may then output an identifier for a cell record having a cell characteristic that matches that of the unknown cell.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

An embodiment of the present invention may include an apparatus, program product and computer-implemented method for evaluating design code for an integrated circuit. The embodiment may receive a request for a cell record that corresponds to a particular cell or cell grouping. The cell record may further be associated with one or more cell characteristics. Exemplary characteristics may regard the origin of cell, such as its creation date or parent library. One embodiment may sample and apply a cell characteristic from the design code to a database configured to store a plurality of identifiers. The database may further maintain a plurality of cell characteristics associated with the plurality of cell records. The embodiment may ultimately retrieve and output an identifier associated with the cell from the database. An environment suited for execution of such an embodiment is illustrated in FIGS. 1 and 2.

Hardware and Software Environment

Figure 1:
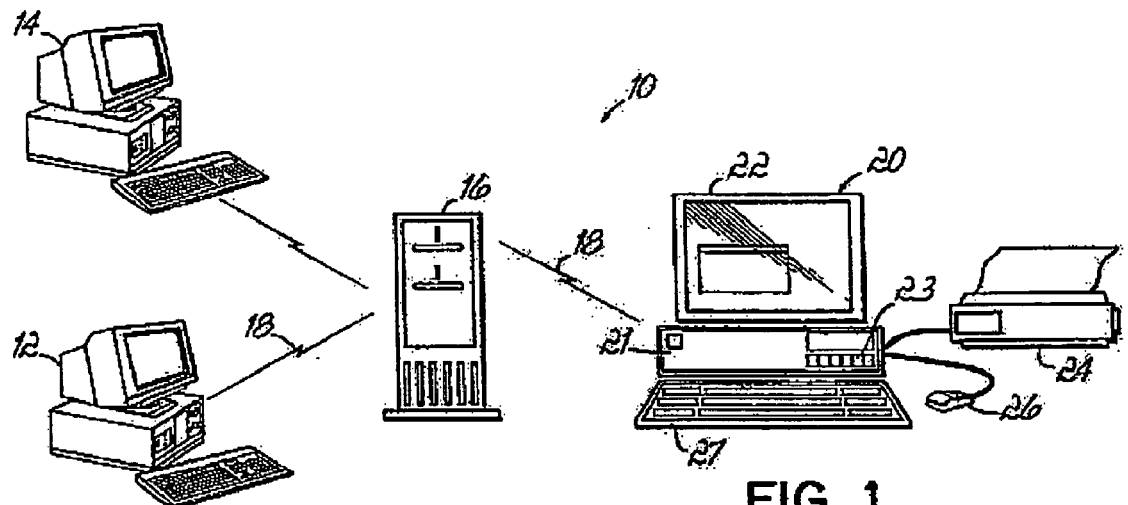
FIG. 1 is a block diagram of a networked computer system consistent with the invention.
Figure 2:
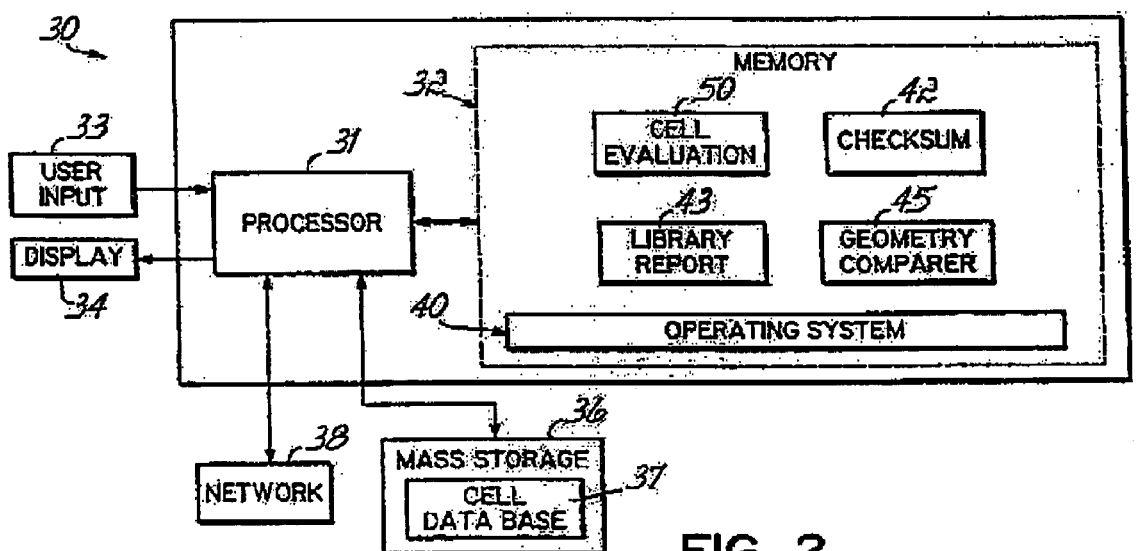
FIG. 2 is a block diagram of an exemplary hardware and software environment for a computer from the networked computer system of FIG. 1.

Turning to the Drawings, wherein like numbers denote like parts throughout the several views, FIG. 1 illustrates a computer system 10 suitable for evaluating an I.C. design file in a manner consistent with the invention.

Computer system 10 is illustrated as a networked computer system including one or more designer computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 represents a networked interconnection, including, but not limited to local-area, wide-area, wireless, and public networks (e.g., the Internet). Moreover, any number of computers and other devices may be networked through network 18, e.g., multiple servers.

User computer 20, which may be similar to computers 12, 14, may include: a central processing unit (CPU) 21, a number of peripheral components such as a computer display 22, a storage device 23, a printer 24, and various input devices (e.g., a mouse 26 and keyboard 27), among others. Server computer 16 may be similarly configured, albeit typically with greater processing performance and storage capacity, as is well known in the art.

FIG. 2 illustrates a hardware and software environment for an apparatus 30 suitable for identifying cells within an I.C. design file in a manner consistent with the principles of the invention. In the embodiment, apparatus 30 may represent a computer, computer system or other programmable electronic device, including: a designer computer (e.g., similar to computers 12, 14 and 20 of FIG. 1), a server computer (e.g., similar to server 16 of FIG. 1), a portable computer, an embedded controller, etc. Apparatus 30 will hereinafter also be referred to as a "computer," although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored within a cell database 37 or on another computer coupled to computer 30 via network 38.

Computer 30 also may receive a number of inputs and outputs for communicating information externally. For interface with a layout designer, computer 30 typically includes one or more input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer, and interface with the computer may be implemented through client computer or workstation networked with computer 30.

For additional storage, computer 30 may also include one or more mass storage devices 36 configured to store a cell database 37 and/or cell library and compiler data. Exemplary devices 36 may include: a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38.

Computer 30 operates under the control of an operating system 40, and executes various computer software applications, components, programs, objects, modules, etc. (e.g., cell evaluation program 50, checksum program 42, library report generator 43, geometry-based comparison program 45, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs" or "program code." The computer programs typically comprise one or more instructions that are resident at various times in various computer memory and storage devices. When a program is read and executed by a processor, the program causes the computer to execute steps or elements embodying the various aspects of the invention.

Moreover, while the invention has and hereinafter will be described in the context of fully functioning processors and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

I.C. Design File Evaluation

Figure 3:
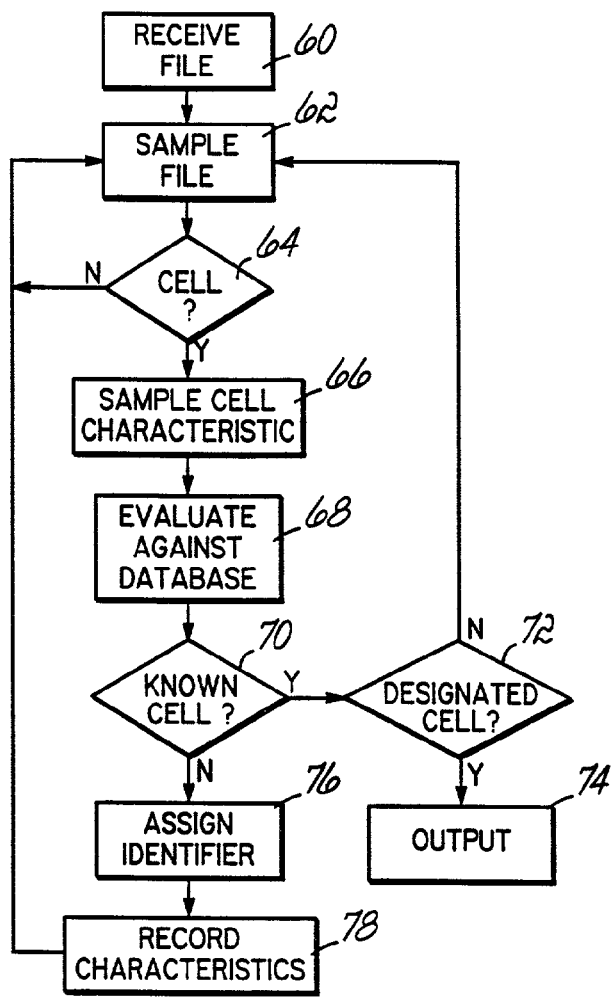
FIG. 3 is a flow chart embodying one method of evaluating an I.C. design file within the environments of FIGS. 1 and 2.

The flowchart of FIG. 3 illustrates an exemplary embodiment for evaluating an I.C. design file within the hardware and software environments of the first two figures. More specifically, the illustrated process steps use a cell characteristic to assign and identify a cell record. For purposes of one embodiment, a cell record may contain a cell identifier and at least one such cell characteristic. The computer-implemented method embodied in the flowchart catalogs an identifier in a database configured to store and recall it along with characteristics that pertain to the cell. Such characteristics may regard the origin of cell, such as its creation date or parent library. One embodiment ultimately associates the identifier or characteristic with a cell embedded in the design file.

Turning to block 60 of FIG. 3, an I.C. design file may arrive at a processor, such as the computer system 30 of FIG. 1. The embodiment may not require the file to have a specific manufacturing syntax. However, exemplary formats may include CIF or GDS, which conventionally comprise a stream of binary bits that encode a sequence of records. Some of these records may relate to descriptions of logical units, or cells. The cells are standard electronic components that designers may integrate to create a semiconductor layer. In addition to cell descriptions, other structures within the design file may comprise instructional or bureaucratic header information. Such header data may be included for departmental or notational purposes by various programmers throughout a design process.

At block 62, the embodiment may sequentially sample all records contained in a file. For instance, a parser may relay a preset number of consecutive bits from the file into the register of a processor. The bit sequences, which encode the records, may then be processed and categorized as appropriate to a given application. For instance, one embodiment may concern itself solely with those file records that relate to a characteristic or processing instruction associated with a cell. As such, it may be advantageous to distinguish cell records from those header records that may be peripheral to the present application. For processing considerations, the embodiment may disregard superfluous header records, instead focusing on only those records that describe or contribute to cell structure.

Consequently, the embodiment may ascertain at block 64 whether a sampled record encodes a cell. Program code of the embodiment may assess the size, placement and/or sequence of registered bits to determine the nature of the record. Tags and other indicators programmed into the manufacturing code may further provide a means for distinguishing cell records from other header data. The program may continue to consecutively sample file records at block 62 until a cell structure is indicated at block 64.

Should the embodiment detect at block 64 that a record is, in fact, a cell, characteristics of the cell may be evaluated at block 66. For purposes of the invention, suitable cell characteristics may embody any property that relates or predictably describes a cell or cell function. The embodiment may evaluate and rely on a single such characteristic to unilaterally identify and/or categorize cells within the file. For example, the date that a cell was created may be identified as a distinguishing characteristic.

Alternatively or in addition, some applications may require the evaluation of multiple cell characteristics. Such an application may be appropriate where a number of cells within a file share one or more common characteristics. As such, a range of characteristics may form a unique compilation of properties sufficient to allow for identification. The scope of still another application may be steered by detected cell characteristics. As such, the embodiment may apply a hierarchical sequence of successive evaluations configured to sufficiently screen cells. For example, if a first characteristic indicates that a compiler created a cell, then the embodiment may additionally record a creation date to assist in determining the particular compiler of origin.

The focus of an evaluation process may further determine the type of cell characteristics upon which the embodiment will rely. For example, one application may require program code to uniquely identify a particular cell. More particularly, a designer may require the detection of a faulty or copyrighted cell that may have been incorporated into a design file. As such, a characteristic or set of characteristics unique to the particular cell may be applied and evaluated against each cell in the file.

Another application may call for an entire class of cells to be identified. A designer may initiate such an evaluation where an entire library is deemed inappropriate. In such a scenario, a characteristic unique to all the cells retrieved from the inappropriate, parent library may be employed as the evaluative characteristic. Where applicable, program code of the embodiment may utilize multiple cell characteristics as dictated by differing evaluation and processing requirements.

One such characteristic may involve a unique, numerical value or signature. A preferred embodiment may use a checksum algorithm to arrive at such a mathematical fingerprint. For example, the embodiment may transmit 16 bits of a cell to an adder. The adder may sum the bits to arrive at number that is unique to the cell. Another embodiment may evaluate an entire cell string by dropping a least significant bit from the register, and then adding a next occurring bit to the accumulating value of the cell count. Variations and more sophisticated mathematical manipulations can produce more tailored applications and signatures. For instance, another embodiment may sum or multiply a sampling of the cell's most and least significant bits. As discussed below in more detail, such a checksum application can additionally prove useful in verifying the integrity of already identified cells.

Another embodiment may partially rely on descriptive data imputed onto cell records during progressive design stages. Such data may be purely descriptive in nature, including designer or corporate notation. Other data may reflect an automatic registration or other processes, such as a date/time stamp. Some I.C. manufacturing formats, including GDS, incorporate such time stamps that reflect the creation or modification date of a cell. The embodiment may capitalize on this notational feature by stripping the time stamp information out of the file at block 66. As discussed below, such time stamps may present a viable means for establishing a unique cell identifier.

The extent and scope of time stamp utilization may depend, in part, upon the reliability and integrity of the particular stamping processes. For instance, where a certainty exists that the time stamps within a particular file have been consistently assigned and preserved, the time stamps may serve a role within an identification scheme of the embodiment. Program code may employ such time stamps as a means of determining other characteristics, such as the compiler or library where a cell originated. However, alterations and inconsistencies within a file may largely abrogate the utility of time stamps in the context of other applications.

Similarly, cell structures within a file may contain cell "names," attributed by file designers. While such names may have effectively related to a cell during one step of a design process, reliance on such names as a means of identification may be impractical due to inconsistent and arbitrary name treatment. More specifically, iterations of programming may have largely diluted any meaningful or reliable association with the cell. For instance, designers routinely disassociate cells when they discard or repetitively modify such names throughout a single programming process. Designers may alter names for design purposes or for mere preference. Consequently, while such names may be compatible with an embodiment of the invention, they are generally insufficient to serve as a single characteristic capable of reliably identifying a cell.

Other applications may sample and evaluate geometric-based characteristics, such as the shape or metal content of a cell. While such exemplary characteristics may serve as a viable means of distinguishing and identifying some cells, the massive memory and processing requirements associated with geometric and measurement based programs may prove impractical or inefficient for many file applications. However, a sampling of partial or even full geometric characteristics may not prove preclusive in other processing efforts consistent with the embodiment. For instance, program code may maintain a database configured to compare geometric characteristics and derived data using commercially, available comparison programs.

Furthermore, geometric applications may be limited to second or third level evaluation cycles. That is, program code may restrict geometric applications to only those occurrences where threshold characteristics of a cell have already registered. For instance, in an effort designed to detect a cell containing a specific logo structure, the embodiment may reserve geometric comparisons for only those cells that first match a designated time stamp and checksum value.

The sampled characteristics may ultimately serve as a means of identifying a cell or collection of cells. Cell identification may require the characteristics to be compared to and associated with a plurality of recorded characteristics. The embodiment may store the recorded characteristics within the cell database. The database may additionally maintain a plurality of cell identifiers that uniquely correspond to one or more of the recorded cell characteristics. In this manner, the identifier may act as a means of uniquely designating a cell or group of cells having a particular characteristic or set of characteristics. At block 68 of FIG. 3, the embodiment may evaluate a sampled cell characteristic against the plurality of those maintained within such a cell database.

Figure 4:
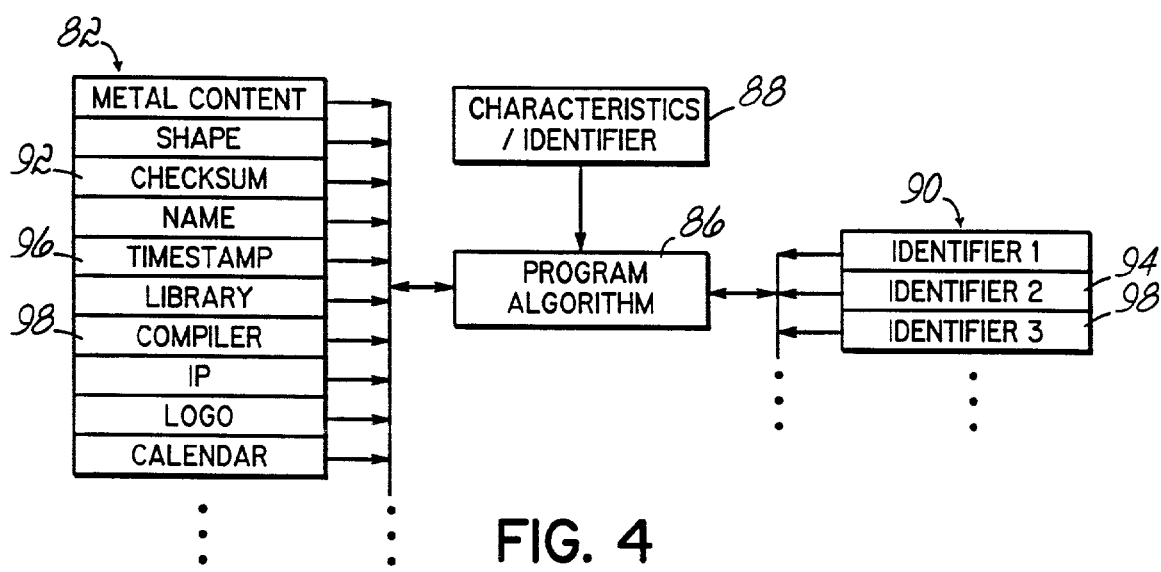
FIG. 4 illustrates a logical structure for the database illustrated and applied in FIGS. 1–3.

FIG. 4 illustrates a database configured to maintain the characteristics sampled in block 66 of FIG. 3. In FIG. 4, a column 82 of exemplary cell characteristics occupy fields within the mapped database 37. During evaluation, a suitable search algorithm 86 of FIG. 4 may match a database field 92 associated with a sampled cell characteristic 88. The algorithm 86 may subsequently retrieve an identifier 94 associated with the characteristic field 92 from a column of identifier fields 90. As discussed herein, an identifier may correspond to a cell on a one-to-one basis, as well as to a group of cells sharing a common characteristic or collection of characteristics. For instance, a particular application may prompt the search algorithm 86 to associate all cells having a common time stamp 96 with a single identifier 98. Of note, an identifier field may be logically paired with one or more cell characteristics to comprise a cell record in one embodiment.

Conversely, several identifiers 90 of FIG. 4 may share common database associations with select characteristics 82. Consequently, the embodiment may cause the algorithm 86 to access multiple characteristic fields 82 to distinguish from among such identifiers. Returning to FIG. 3, a common cell characteristic may prompt a program of the embodiment to sample additional characteristics from the cell at block 66. The database may evaluate these additional characteristics in conjunction with the first to more accurately determine an applicable identifier. Again, while the identifier may be unique to the cell characteristic(s), it may nonetheless relate to multiple cells. Such may be the case where the characteristic describes a common library of origin.

Returning to the database of FIG. 4, evaluation of certain characteristic fields may automatically prompt searches of additional fields. For example, the retrieval of a generic compiler field 98 of FIG. 4 may prompt program code to initiate the retrieval of time stamp 96 and production calendar 100 information to more particularly determine the compiler that created the cell.

The embodiment may populate the identifier fields of the database in a variety of ways. For example, the manner in which the database is populated may depend upon the source of the cell characteristics. For instance, processes required to access data derived from libraries may vary considerably from those needed to retrieve comparable data from compilers and other sources. More particularly, when recording characteristics from library-derived cells, the embodiment may receive files or reports generated from remote library design entities. The files may contain compatible identifiers that are preassigned to leaf or child cells. Other library reports may merely embody cell characteristics that a program of the embodiment can further process to assign an identifier.

Program code may initiate the automatic generation of such library reports, as well as the extraction of identifying information and characteristics. As such, the embodiment may scan and retrieve identifiers and related data from other databases containing library resources. Program code may incorporate this library data into the database for use in identifying presented cell structures. As discussed below in greater detail, identifiers may additionally be assigned and accumulated within the database as the embodiment processes cell characteristics conveyed in sampled design files. In any case, program code of the embodiment may cause the database to be populated with cataloged library cells and associated identifiers.

While the relatively small number of library cells within a file may lend themselves to thorough evaluation, cells produced by compilers may present unique concerns. Compilers typically mass produce memory cells, such as dual output RAM, in response to specifications submitted by a designer. For instance, a designer may command a compiler to automatically design a cell having 512 memory locations, each containing 27 bits. The compiler may produce numerous conforming cells for the designer to incorporate into their layout.

The great number and variety associated with such compiler-originated cells can complicate storage of the actual cells within a single, comprehensive database. While such a database is compatible with the principles of the present invention, its absence would not preclude cell identification within one embodiment. A program of the embodiment may retrieve signatures for compiler cells through a prearranged scheme with the compiler designer, such as through an http channel transmission. In this manner, only certain cells produced by the compiler may be downloaded to the database.

Another embodiment may initiate the parallel production of a signature file that accompanies compiler cell output. The embodiment may configure and record a signature file such that its contents may be routinely extracted and processed. In this manner, the embodiment may import only relevant portions of the compiler signature file into the design database. As such, the signatures may be evaluated by direct comparison as discussed above. Still another embodiment may configure a compiler to produce and place an appropriate identifier into a portion of the I.C. design file. As such, a processor of the embodiment may extract the identifier for recordation within the database. In addition, the embodiment may actively compile occurrences of cells within the database at block 76 as design files are processed.

Should a cell characteristic of an evaluated cell match an identifier at block 70 of FIG. 3, then a program of the embodiment may further evaluate the identifier at block 72. Namely, program code may compare the identifier of the cell to that of a designated identifier. Such an identifier may be designated by a designer or control process for the purpose of locating a particular cell or cell group. For instance, a designer may wish to verify that a particular, defective cell is not included in a design layout. The designer may type in or otherwise indicate the identifier that corresponds to the defective cell.

At block 72 of FIG. 3, program code of the embodiment may compare the identifiers of the cells contained in the file with the designated identifier. Should a match be detected, the embodiment may output a notification to the designer at block 74. The designer may substitute a suitable cell for the identified defective one, saving substantial productions costs. Similarly, an automated process may designate identifiers that correspond to cells associated with license fees or unauthorized modifications.

An automatic process may additionally screen a design file for cells that originate from a particular library or compiler. Such an application may be useful in verifying that cells are retrieved from an appropriate library. For instance, while most cells may default to a most recent library version, a copyrighted cell may require an archived library. The embodiment may output the identifier of the cell so that the designer can ensure the proper library relationship. In this manner, the embodiment may evaluate commercial and functional aspects of the design file, diminishing the occurrence of inappropriate cells prior to production.

A designer may alternatively designate a characteristic at block 72 of FIG. 3. For instance, the designer may desire a listing of which cells in the file originated from a particular compiler. Another automated process may search all design files for cells associated with a particular library or time stamp. As above, the embodiment may search the cell database, only now program code may search cell characteristic fields of the database. The embodiment may output identifiers associated with located characteristic fields at block 74. Thus, the embodiment allows the designer to initiate an evaluation of design files from the perspective of both an identifier and cell characteristic.

Should an unidentified cell be presented to the embodiment at block 70, program code may initiate processes configured to record the cell's characteristics within the database. At block 76 of FIG. 3, the program may additionally assign and catalog an identifier to the cell. While the embodiment may manufacture and assign identifiers according to any common scheme, an identifier may correspond directly to the cell characteristic. For instance, program code may designate the checksum value sampled at block 46 as the cell's identifier. Of note, all cell characteristic fields derived from a cell may additionally be associated with the newly created and cataloged cell identifier. In this manner, the embodiment may passively accumulate its own record of cell characteristics by assigning and recording identifiers to cells as presented in files.

As discussed above, cell characteristics sampled at block 46 of FIG. 3 may now be recorded at block 78. These characteristics may populate fields in the database along with additional properties extracted from the cell at block 78. These additional characteristics may eclipse those characteristics searched at block 46, accounting for other cell properties. Program protocol may initiate the sampling and storage of these additional cell characteristics within the database to anticipate future searches. As discussed above, the database may be configured such that the entry of particular characteristic fields cause program code to populate and automatically associate additional fields relating to the cell. For instance, a cell characteristic such as a time stamp may prompt the program to associate the field with a corresponding identifier and a listing of potential libraries.

One embodiment may incorporate an additional step after block 78 of FIG. 3 intended to notify designers of potentially mangled or otherwise corrupted cells. For instance, such a step could be useful in an application where a designer anticipates a majority of file cells are accounted for in the cell database. As such, the embodiment could output an warning to the designer coincident with the detection of an unidentified cell. More particularly, program code could initiate a notification every time an unknown checksum is encountered.

Similarly, a designer may initiate a global checksum operation to further reduce the occurrence of error. Such a step may embody the more conventional use of a checksum as an error-detection scheme. As such, the checksum algorithm may be applied to the cell to ensure the accompanying numerical value is the same. If a disparity is detected, a notification may cause a designer to verify that the cell corresponding to the new checksum is not corrupted.

Figure 5:
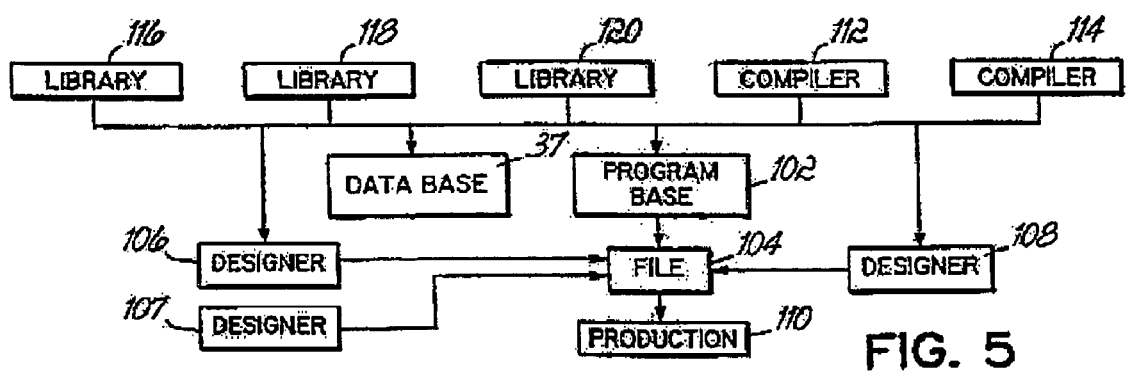
FIG. 5 is a schematic diagram illustrating an I.C. design file evaluation session and environment suited for executing the process steps of FIG. 3 in a manner consistent with the principles of the present invention.

FIG. 5 incorporates the database 37 of FIGS. 2 and 4 into a schematic block diagram suited for executing the process steps of FIG. 3. Generally, the database 37 is accessed by program code 102 configured to evaluate an I.C. design file 104. Layout designers 106, 107, 108 may access the file 104 prior to the file's transmittal to production 110 at "tape-out."

The designers 106, 107, 108 may construct the file 104 from cells imported from various compilers 112, 114 and libraries 116, 118, 120.

The I.C. design file 104 may employ CIF or GDS manufacturing syntax to encode cell descriptions. More particularly, the file 104 describes and defines mask parameters as read by the production equipment 110. Designers 106, 107, 108 may access libraries 116, 118, 120 and compilers 112, 114 to incorporate invertors, capacitors, gates, oscillators, multiplexors and/or other cells to construct a chip layer. Parent libraries 116, 118, 120 may store individual cells along with others grouped by version or designer preference. Designers 106, 107, 108 may use default cells from a most recent library version 120 to populate the I.C. design file 104 via any networked communication means contemplated in FIGS. 1 and 2. Other applications may require proprietary cells from a more dated, particular library 118.

Due to the complex dynamics inherent to a design process, a single I.C. design file may contain multiple error instances. For example, faulty or otherwise obsolete cells may be erroneously incorporated or retained within the design file 104. Another included cell may be modified for another application by a designer 107 unauthorized to do so. Left undiscovered, these errors can mar production 110 and waste resources.

One embodiment of the present invention mitigates the occurrence of these and other errors during an evaluation process. A processor may sequentially sample all records contained in a file 104 until a cell structure is detected. Program code 102 may then evaluate cell characteristics of the record. While such characteristics as time stamps and checksum values have been discussed in detail, suitable cell characteristics may embody any property that relates or predictably describes a cell or cell function. Program code 102 may evaluate and rely on one or more such characteristics to monitor cells within the file.

The goal of an evaluation procedure may dictate relevant characteristics. For example, one application may require program code 102 to identify a cell containing a required trademark. As such, a characteristic or set of characteristics unique to the particular cell may be applied and evaluated against each cell in the file 104. Another application may call for the identification of an entire class of cells. A designer may initiate such an evaluation where an entire library 116 is suspect. As such, a characteristic unique to all cells retrieved from the defective parent library 116 are used for identification. Program code 102 may sample multiple cell characteristics as dictated by differing evaluation and processing requirements.

Program code 102 may ultimately compare a sampled cell characteristic against the plurality of those maintained within the cell database 37. One such characteristic may involve a numerical signature or checksum value. Another embodiment may rely on a time stamp. Other applications may sample and evaluate geometric-based characteristics, such as the shape or metal content of a cell. In any case, the sampled characteristics may ultimately serve as a means of identifying a cell or collection of cells.

Of note, cell identification may require the characteristics to be compared to and associated with a plurality of recorded characteristics. The processor 30 may store the recorded characteristics within the cell database 37. The database 37 may additionally maintain a plurality of identifiers that uniquely correspond to one or more of the recorded cell characteristics. In this manner, the identifier may act as a means of uniquely designating a cell or cell grouping having a particular characteristic or set of characteristics.

Program code 102 may populate fields of the database 37 by receiving files or reports generated from a library 120 or compiler 112. The library reports may document cell characteristics that program code 102 may process to arrive at an identifier. Program code 102 may initiate the automatic generation of such reports, as well as the extraction of identifying information and characteristics. As such, the embodiment may scan and retrieve identifiers and related data from other databases containing library and/or compiler resources.

Program code 102 may match a located cell characteristic to an identifier. That identifier may then be evaluated against an identifier designated by a designer 108 for the purpose of locating a particular cell or cell group. For instance, a designer 108 may wish to locate any proprietary cells included in a design layout. Should an identifier match be detected, the program code 102 may output a notification to the designer 108. Thus, the designer 108 may investigate the application of the proprietary cell prior to committing the design to silicon. Of note, program code 102 allows a designer 108 to direct an evaluation of the design file 104 from either the perspective of an identifier or cell characteristic.

Program code 102 may additionally screen a design file 104 for cells that originate from a particular library or compiler. Such an application may be useful for verifying that cells are retrieved from an appropriate library. For instance, while most cells may default to a most recent library version 120, certain cells may erroneously point to an inappropriate or dated library 116. By detecting file cells originating from the parent library 116, the designer 108 may substitute a more appropriate cell, diminishing the occurrence of faulty cells prior to production. Cell characteristics of unidentified cells presented to the processor 30 may be recorded with the database 37. Program code may additionally assign and record an identifier to the cell. Such data may be utilized during future evaluation sessions.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of processing integrated circuit design data, comprising:
   a) reading information from a file;
   b) determining whether an integrated circuit layout cell has been read;
   c) if the determination of (b) is affirmative, determining whether the integrated circuit layout cell read from the file, is a known cell by comparing a set of cell characteristics contained within the integrated circuit layout cell to a plurality of sets of cell characteristics contained within a database, wherein each set of cell characteristics within the database is associated with a unique known cell;
   d) if the determination of (c) is affirmative, a determining whether a designation of a cell characteristics has been made, wherein the designation of cell characteristics is suitable for identifying at least a particular cell;

e) if the determination of (d) is affirmative, determining if there is a match between at least a portion of the cell characteristics of the integrated circuit layout cell and the designated characteristics; and f) if the determination of (e) is affirmative, providing an output indicative of the match.

2. The method of claim 1, wherein the cell characteristics comprise at least one of the group consisting of a geometric shape, a checksum, a name, a timestamp, a library, a compiler, a copyright designator, a license fee designator, and a calendar.

3. The method of claim 2, further comprising:
if the determination of (c) is negative, assigning an identifier to the integrated circuit layout cell; and recording the characteristics thereof in a database.

4. The method of claim 3, further comprising:
repeating (a) through (f).

5. The method of claim 1, further comprising:
if the determination of (e) is affirmative, replacing the integrated circuit layout cell with a replacement cell.

* * * * *